US006461463B1

United States Patent
Weder

(10) Patent No.: US 6,461,463 B1
(45) Date of Patent: *Oct. 8, 2002

(54) PROCESS FOR PRODUCING HOLOGRAPHIC MATERIAL

(75) Inventor: Donald E. Weder, Highland, IL (US)

(73) Assignee: Southpac Trust International, Inc., Rarotonga Cook Island (*) Notice: Subject to any disclaimer, the term of this patent is extended or adjusted under 35 U.S.C. 154(b) by 52 days.

This patent is subject to a terminal disclaimer.

(21) Appl. No.: 09/632,616

(22) Filed: Aug. 8, 2000

Related U.S. Application Data

(63) Continuation of application No. 09/372,526, filed on Aug. 11, 1999.

(51) Int. Cl.[7] .............................................. B32B 31/00
(52) U.S. Cl. ...................................... 156/209; 156/219
(58) Field of Search ........................... 156/209, 219, 156/230, 231, 232, 233, 237, 239, 240, 249, 277

(56) References Cited

U.S. PATENT DOCUMENTS

| | | | |
|---|---|---|---|
| 4,773,718 A | 9/1988 | Weitzen et al. ............. 350/3.61 |
| 4,840,757 A | * 6/1989 | Blenkhorn ..................... 264/22 |
| 4,906,315 A | * 3/1990 | McGrew ....................... 156/231 |
| 5,104,471 A | * 4/1992 | Antes et al. .................. 156/233 |
| 5,662,986 A | 9/1997 | Stepanek ..................... 428/195 |
| 5,695,808 A | 12/1997 | Cueli ............................. 427/9 |
| 5,723,203 A | 3/1998 | Stepanek ..................... 428/195 |
| 5,727,362 A | * 3/1998 | Weder ........................... 53/397 |
| 5,735,989 A | 4/1998 | Stepanek ..................... 156/237 |
| 5,746,865 A | 5/1998 | Stepanek ..................... 156/233 |
| 5,766,734 A | 6/1998 | Stepanek ..................... 428/195 |
| 5,871,608 A | 2/1999 | Stepanek ..................... 156/233 |
| 5,882,463 A | * 3/1999 | Tompkin et al. ............. 156/234 |
| 5,900,095 A | 5/1999 | Stepanek ..................... 156/230 |
| 5,939,177 A | 8/1999 | Stepanek ..................... 428/195 |
| 6,060,003 A | * 5/2000 | Karszes ....................... 264/1.34 |
| 6,132,822 A | * 10/2000 | Overcash et al. .......... 428/34.2 |

FOREIGN PATENT DOCUMENTS

EP 0741370 A1 * 11/1996

* cited by examiner

*Primary Examiner*—Michael W. Ball
*Assistant Examiner*—Gladys J. Piazza
(74) *Attorney, Agent, or Firm*—Dunlap, Codding & Rogers, P.C.

(57) ABSTRACT

Processes for producing a holographic material involve producing the holographic image on a polished, substantially smooth surface and then transferring the holographic image to a substrate. A metallic coating is applied to a smooth surface of a printing element to provide a coated surface, the coated surface is embossed to provide the holographic image, and the holographic image is transferred to a substrate via a bonding material, thereby producing the holographic material. The holographic material may be used to provide a decorative cover for an object or item, such as a floral grouping or a potted plant.

13 Claims, 4 Drawing Sheets

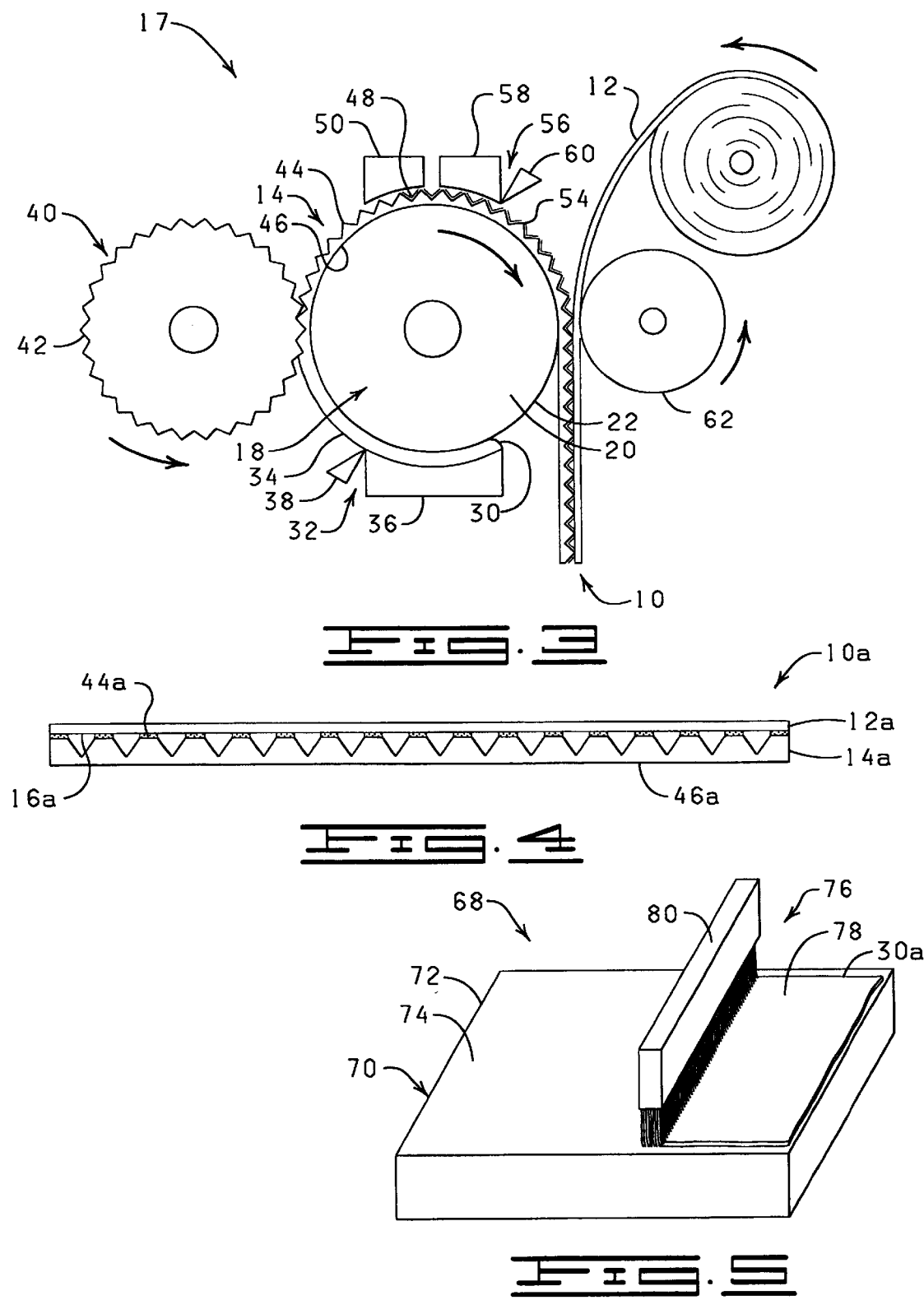

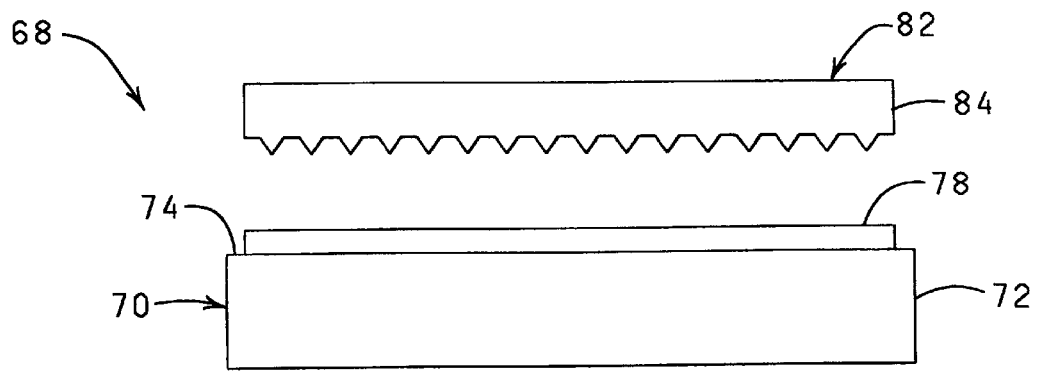
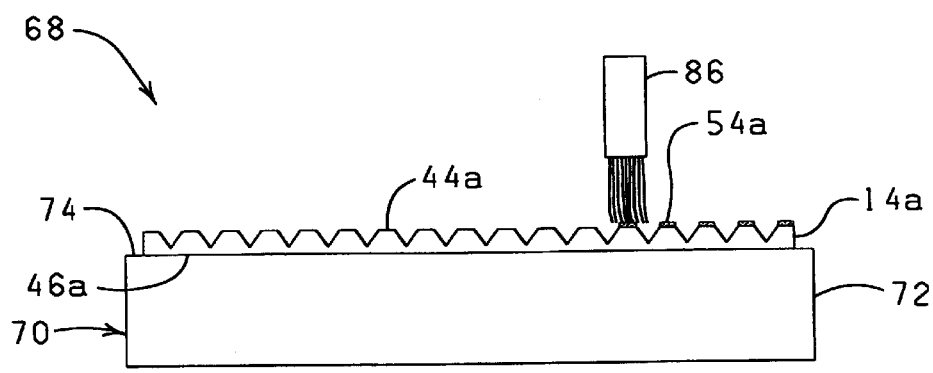
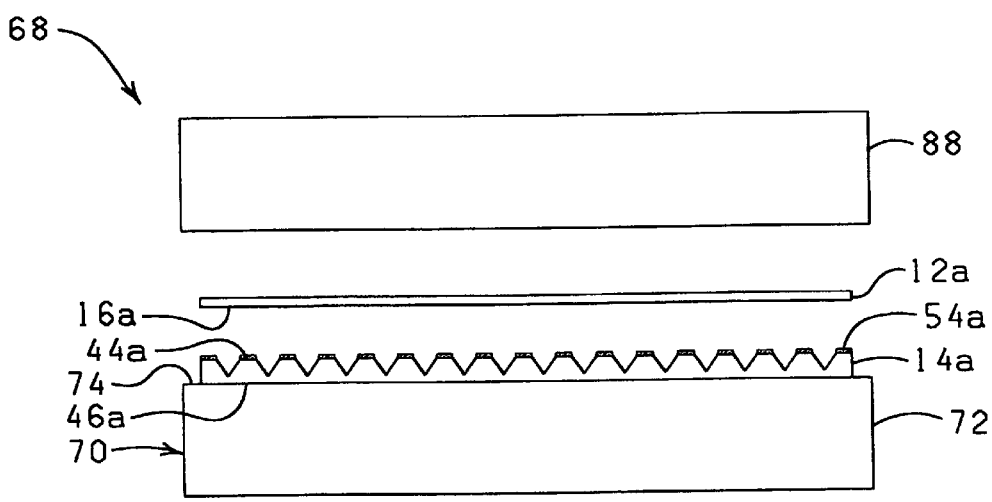

PROCESS FOR PRODUCING HOLOGRAPHIC MATERIAL

CROSS REFERENCE TO RELATED APPLICATIONS

This application is a continuation of Ser. No. 09/372,526 filed Aug. 11, 1999.

STATEMENT REGARDING FEDERALLY SPONSORED RESEARCH OR DEVELOPMENT

Not applicable.

BACKGROUND OF THE INVENTION

1. Field of the invention

The present invention relates generally to processes for producing decorative material, and more particularly, but not by way of limitation, to processes for producing holographic material.

2. Brief Description of the Prior Art

Processes for producing holographic materials are well known in the art. One process involves passing a layer of plastic, for example, through a machine which imparts an image within the covering or upper strata of the plastic layer. A powdered metallic constituent or component (e.g. aluminum) is then applied thereon by a metalizing process. After metalizing, a holographic or 3-dimensional image is imparted on the metalized layer of plastic. This image is extremely pleasing and is widely used within the credit card and security industries since the resulting image is difficult to duplicate and thus assists in the prevention of fraud by counterfeiting, for example. However, images produced by this process can be quite expensive since the machines required for production of the images are complicated and costly in and of themselves. Additionally, holographic images produced by this process are usually small in size, and larger holographic images cannot be imprinted by this process. Thus, this process of producing holographic images has not been widely used outside of the credit card and novelty industry.

A process for producing large sheets of holographic material at a lower cost than the process described above involves producing the holographic image laminated to a polymeric support, contacting the holographic image on the polymeric support to a substrate such as tissue paper or foil via an adhesive, and delaminating the polymeric support, thereby transferring the holographic image from the polymeric support to the tissue paper or foil substrate. The image cannot be directly applied to a substrate having a rough surface because the rough surface of the substrate will refract light and will not have a highly reflective finish, thereby disrupting the holographic image.

Therefore, new and improved methods for producing holographic material requiring less time and expense are being sought. It is to such a process for producing holographic material that the present invention is directed.

SUMMARY OF THE INVENTION

According to the present invention, processes for producing holographic material are provided which avoid the disadvantages and defects of the prior art, making the processes more economically feasible. Broadly, processes are provided for transferring holographic images to a substrate to produce a holographic material. These processes involve producing the holographic image on a polished, substantially smooth surface and then transferring the holographic image to a substrate, thereby bypassing the need for the polymeric support used in the prior art.

In one aspect of the present invention, a printing element having a polished, substantially smooth surface is provided, and a metallic coating is applied to the smooth surface of the printing element to provide a coated surface. The coated surface is embossed to provide the holographic image on the coating, and the holographic image is then transferred to a substrate, thereby producing a holographic material.

In another aspect of the present invention, a non-metallic coating may be applied to the smooth surface of the printing element to provide a coated surface, which is then embossed to provide an image. The embossed coated surface is then metalized to provide a holographic image on the coating, and the holographic image is transferred to a substrate to produce the holographic material.

The production of holographic materials in accordance with the present invention may be performed as a continuous process or as a batch process. Applications of the holographic materials produced in accordance with the present invention include wrapping a floral grouping and providing a decorative cover for an object such as a flower pot or a potted plant, as well as decorative wrappings for various food and gift items.

An object of the present invention is to provide improved processes for producing holographic materials.

Another object of the present invention, while achieving the before-stated object, is to provide processes for producing holographic materials which do not suffer from the disadvantages of the prior art processes.

Other objects, features and advantages of the present invention will become apparent from the following detailed description when read in conjunction with the accompanying drawings and appended claims.

BRIEF DESCRIPTION OF THE DRAWINGS

FIG. 3 is a partial schematic representation of another continuous process for producing holographic material utilizing a cylindrical drum.

FIG. 4 is a side plan view illustrating a holographic material produced by a batch process in accordance with the present invention.

FIG. 5 is a diagrammatic representation of a flat plate used to produce holographic materials in accordance with the present invention, the flat plate having a coating disposed on a surface thereof.

FIG. 6 is a diagrammatic representation of the flat plate with a coated surface of FIG. 5 and an embossing plate for embossing the coated surface of the flat plate to provide an embossed coated surface with a holographic image thereon.

FIG. 7 is a diagrammatic representation of the flat plate of FIG. 6 having an embossed coated surface and a holographic image thereon, the embossed coated surface of the flat plate having an adhesive applied thereto.

FIG. 8 is a diagrammatic representation of the flat plate of FIG. 7 having an embossed coated surface with a holographic image thereon and an adhesive applied thereto, the adhesive bondingly connecting the embossed coated surface to a substrate to produce a holographic material constructed from the coating containing a holographic image and the substrate.

DETAILED DESCRIPTION OF THE INVENTION

Figure 1:
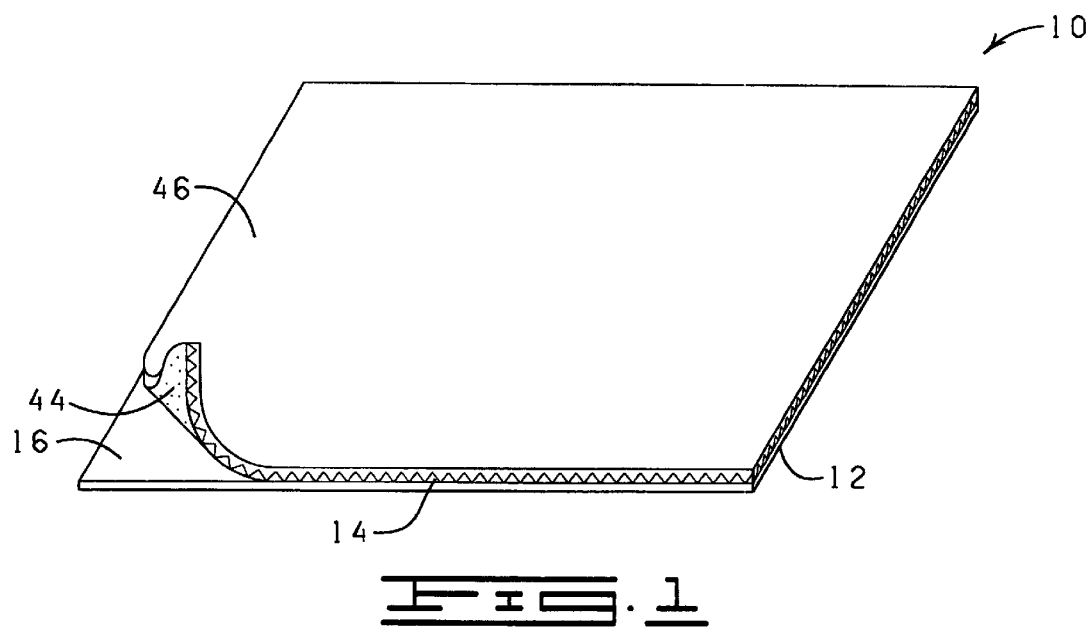
FIG. 1 is a perspective view illustrating a holographic material produced by a continuous process in accordance with the present invention.

Referring now to the drawings, shown in FIG. 1 and designated therein by the reference numeral 10 is a holographic material constructed in accordance with the present invention by a continuous process. The holographic material 10 comprises a substrate 12 having a holographic design or image 14 formed thereon. The holographic image 14 provides the holographic material 10 with a holographic or 3-dimensional appearance.

The term "holographic image" as used herein is to be understood to mean a three-dimensional image most visible from an oblique angle. The unique properties of holographic images are that they appear to float in space, are true-to-life and can change perspective, that is, permit one to look around corners and watch hidden features of the image come to light.

Further, the "holographic image" can be in any geometric form, or any combination of geometric forms, for example, squares, round spots, triangles, rectangles, octagonals, or the like, or any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional), animal forms (real and fictional), cartoon characters, and/or plant forms. Such holographic images may include a color, or a portion of a color, or a combination of colors and designs. Alternatively, at least a portion of the holographic image may be colorless, translucent, transparent, opaque, pearlescent, iridescent, or the like.

The term "substrate" when used herein means a sheet of material which provides stability to the holographic image 14. The substrate 12 of the holographic material 10 may be flexible or non-flexible. The substrate 12 can be constructed of any suitable material capable of receiving a holographic image, such as polymeric film, non-polymeric film, foil, paper, tissue and combinations thereof. The substrate 12 includes a surface 16 which may be substantially rough and textured or substantially smooth. For example, tissue paper, kraft paper and high density polyethylene film often have rough surfaces, while foil and chromecoat paper typically have smooth surfaces.

The thickness of the substrate 12 can vary widely. Generally, however, the substrate 12 has a thickness in a range from about 0.0002 mil to about 30 mils, and more desirably from about 0.1 mil to about 20 mils.

Figure 2:
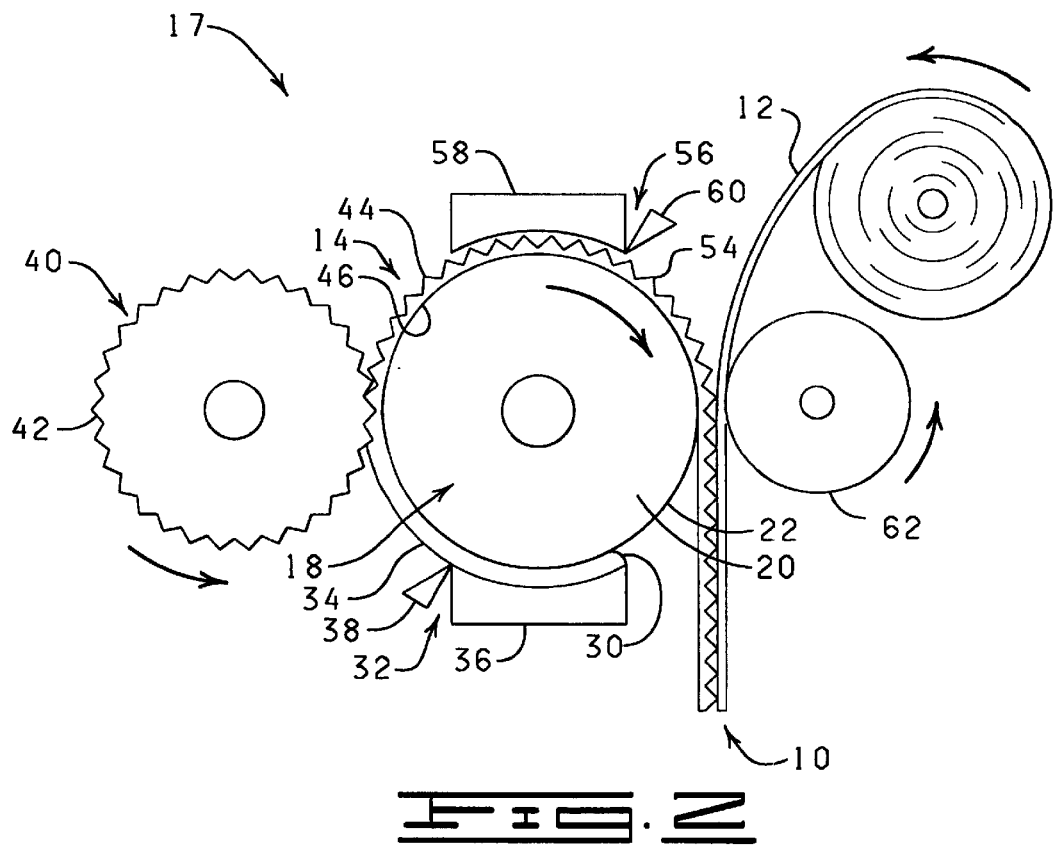
FIG. 2 is a partial schematic representation of a continuous process for producing holographic material utilizing a cylindrical drum.

Referring now to FIGS. 2 and 3, a continuous process 17 for producing the holographic material 10 is schematically illustrated. As will be more fully described hereinafte, the holographic material 10 is produced using a printing element 18. The printing element 18 may be provided with a smooth surface or a rough surface. When the printing element 18 is provided with a smooth surface, the need to produce the holographic image on a substrate having a smooth surface, such as required by the prior art methods, is substantially eliminated.

The term "printing element" as used herein means any element having a surface capable of having a holographic image produced thereon whereby the holographic image can be transferred to a substrate without substantially distorting the holographic image. Thus, the printing element 18 for producing the holographic material 10 by a continuous process 17 may be, for example, but not limited to, a cylindrical drum, a roller and the like. The printing element 18 may be constructed of any suitable material capable of having a polished, substantially smooth surface and which is capable of having the holographic image formed thereon for transfer to a desired substrate. The printing element 18 may be constructed of chrome, stainless steel, tool steel and the like. The printing element 18 may also be constructed in part of a resilient or non-resilient material such that the printing element 18 is provided with a resilient or non-resilient surface.

The printing element 18 illustrated in FIGS. 2 and 3 is a cylindrical drum 20 having a smooth surface 22. The cylindrical drum 20 permits the holographic material 10 to be continuously produced. A coating 30 capable of receiving a holographic image is applied to the smooth surface 22 of the cylindrical drum 20 by a coating assembly 32, thereby providing a coated surface 34 of the cylindrical drum 20. The coating assembly 32 is illustrated as comprising a coating pan 36 and a reverse gravure doctor blade 38. The thickness of the coating 30 on the coated surface 34 of the cylindrical drum 20 can be controlled and maintained within preselected limits by the reverse gravure doctor blade 38 of the coating assembly 32.

It will be understood that other methods of applying the coating 30 to the smooth surface 22 of the cylindrical drum 20 may be employed, such as spraying, brushing, etc.

The term "coating" as used herein is to be understood to mean a maleable film which is able to be embossed to receive a holographic image on at least a portion thereof. For example, the coating 30 may be a metallic material such as metallic polymeric film, metallic non-polymeric film, foil, metalized lacquer and combinations thereof. The coating 30 may also be a nonmetallic material such as polymeric film, non-polymeric film, foil, lacquer and combinations thereof. Wherein the coating 30 is a nonmetallic material, the process for producing the holographic material 10 in accordance with the present invention includes an additional step of metalizing the coated surface 34 of the cylindrical drum 20, which will be described in detail below.

The term "lacquer" as used herein means a coating substance consisting of resinous materials, such as cellulose esters, cellulose ethers, shellac, gum, alkyd resins and the like, which are dissolved in a solvent that evaporates rapidly on application such as ethyl alcohol, thereby leaving a tough, adherent film. Lacquers which are useful in the present invention are mixtures, such as, but not limited to, lacquers produced by mixing styrene-acrylic emulsions, such as Lucidene 603 and Lucidene 395 (Morton International, Inc., 100 North Riverside Plaza, Chicago, Ill. 60606) with a non-ionic surfactant, such as Surfynol 465 (Air Products and Chemicals, Inc., 7201 Hamilton Boulevard, Allentown, Pa. 18195-1501) and arnmonia (G.S. Robbins and Company, 126 Chouteau Avenue, St. Louis, Mo. 63102). The lacquer produced as described above may also contain a wax emulsion in water, such as Liquitron 440 (Carrol Scientific, Inc., 5401 S. Dansher Road, Countryside, Ill. 60525).

The coated surface 34 of the cylindrical drum 20 is then embossed by an embossing element 40, such as an embossing drum 42. Embossing elements are used to produce materials to decorate or cover articles by depressing, carving, raising, or printing designs, patterns, etc. so that at least a portion of the design, pattern, etc. is raised above the surface of the material. Embossing elements are well known in the art; thus, no further discussion of embossing methods need be required.

Embossing of the coated surface 34 of the cylindrical drum 20 produces a holographic image 14 on the coated surface 34 of the cylindrical drum 20. The holographic image 14 is provided with a first surface 44 and a second surface 46 which is substantially adjacent the smooth surface 22 of the cylindrical drum 20.

As shown in FIG. 3, if the coating 30 used to provide the coated surface 34 of the cylindrical drum 20 is formed of a non-metallic material, a metallic constituent or component 48 is applied to the embossed coated surface 34 of the cylindrical drum 20 to provide the holographic image 14. The metallic constituent or component 48 can be applied to the embossed coated surface 34 of the cylindrical drum 20 by any suitable means, such as by discharging the metallic constituent or component 48 from a reservoir 50. Metallic constituents or components which may be employed to metallize the embossed coated surface 34 of the cylindrical drum 20 are known in the art and include powdered metals such as powdered aluminum.

Once the holographic image has been produced, a bonding material 54 is applied to the holographic image 14 by a bonding material applicator 56. The bonding material applicator 56 comprises a pan 58 and a reverse gravure doctor blade 60 for removing excess bonding material 54 and controlling the thickness of the bonding material 54 so as to insure a substantially uniform coating of bonding material 54 on the holographic image 14 present on the cylindrical drum 20. The bonding material 54 applied to the holographic image 14 is contacted with the substrate 12, thereby bondingly contacting the holographic image 14 to the substrate 12 and producing the holographic material 10.

The term "bonding material" when used herein may be an adhesive, such as a pressure sensitive adhesive, or a cohesive. Where the bonding material is a cohesive, a similar cohesive material must be placed on the adjacent surface for bondingly contacting and bondingly engaging with the cohesive material. The term "bonding material" may also be materials which are heat sealable and, in this instance, the adjacent portions of the materials must be brought into contact and then heat must be applied to effect the seal. The term "bonding material" when used herein also means a lacquer, which may be the coating 30 described above. In this instance, heat, sound waves, or vibrations may be applied to effect the sealing of the lacquer. In this way, the coating 30 may both receive the holographic image 14 and effect sealing of the holographic image 14 to the substrate 12, thereby producing the holographic material 10.

To bondingly secure the holographic image 14 to the substrate 12 and to transfer the holographic image 14 from the smooth surface 22 of the cylindrical drum 20 to the substrate 12, various methods may be employed. For example, heat and/or pressure may be applied to effect the seal between the holographic image 14 and the substrate 12.

As shown in FIGS. 2 and 3, a nip formed by opposing rollers of the cylindrical drum 20 and a seating drum 62 may sandwich the holographic image 14 and the substrate 12 to effect a seal between the substrate 12 and the holographic image 14. In addition, the sealing drum 62 may be a heated roller to aid in effecting the seal between the holographic image 14 and the substrate 12.

It will be understood that other methods of bondingly securing and sealing the holographic image 14 and the substrate 12 in the continuous process 17 of producing the holographic material 10 as described herein may be employed in this process, and is not limited to the method described herein.

The holographic material 10 is then removed from the smooth surface 22 of the cylindrical drum 20. Methods of removing the holographic material 10 from the cylindrical drum 20 are known in the art. The holographic material 10 produced by the continuous process 17 may be present in different forms such as a roll or sheets of holographic material 10.

Shown in FIG. 4 is a holographic material 10a constructed in accordance with the present invention by a batch process 68. The holographic material 10a is similar to the holographic material 10 described hereinbefore, and comprises a substrate 12a having a holographic image 14a formed thereon. The batch process 68 for producing the holographic material 10a is illustrated in FIGS. 5, 6, 7 and 8 and described in detail hereinafter.

The holographic material 10a is produced using a printing element 70. The printing element 70 may be provided with a smooth surface or a rough surface. When the printing element 70 is provided with a smooth surface, the need to produce the holographic image on a substrate having a smooth surface, such as required by the prior art methods, is substantially eliminated. The printing element 70 for producing the holographic material 10a by the batch process 68 may be a plate, a platen press and the like. The printing element 70 may be constructed of any suitable material capable of having a polished, substantially smooth surface and which is capable of having the holographic image formed thereon for transfer to a desired substrate. The printing element 70 may be constructed of chrome, stainless steel, tool steel and the like. The printing element 70 may also be constructed in part of a resilient or non-resilient material such that the printing element 70 is provided with a resilient or non-resilient surface.

The printing element 70 illustrated in FIG. 5 is a flat plate 72 having a smooth surface 74, the flat plate 72 permitting the holographic material 10a to be produced in the batch process 68. A coating 30a, which is substantially identical to the coating 30 as described hereinbefore, is applied to the smooth surface 74 of the flat plate 72 by a coating assembly 76, thereby providing a coated surface 78 of the flat plate 72. The coating assembly 76 is illustrated as a coating brush 80. However, it should be understood that other methods of applying the coating 30a to the smooth surface 74 of the flat plate 72 may be employed, such as spraying, dipping, and the like.

The coated surface 78 of the flat plate 72 is then embossed by an embossing element 82, such as an embossing plate 84 shown in FIG. 6. Embossing of the coated surface 78 of the flat plate 72 provides a holographic image 14a on the coated surface 78 of the flat plate 72. The holographic image 14a is provided with a first surface 44a and a second surface 46a which is substantially adjacent the smooth surface 74 of the flat plate 72.

If the coating 30a used to provide the coated surface 78 of the flat plate 72 is formed of a non-metallic material, a metallic constituent or component is applied to the embossed coated surface 78 of the flat plate 72 to provide the holographic image 14a. This process is substantially identical to the metalizing of the embossed coated surface 34 of the cylindrical drum 20 by a metalizing constituent or component 50 to provide the holographic image 10 as described in detail above.

Once the holographic image 14a has been produced, a bonding material 54a, which is substantially identical to the bonding material 54 as described hereinbefore, is applied to the holographic image 14a by a bonding material applicator 86, as shown in FIG. 7. It will be understood that other methods of applying the bonding material 54a to the holographic image 14a on the flat plate 72 may be employed, such as spraying, brushing, etc.

The bonding material 54a applied to the holographic image 14a is contacted with the substrate 12a, thereby bondingly connecting the holographic image 14a to the substrate 12a and producing the holographic material 10a (FIG. 8).

To bondingly connect the holographic image 14a to the substrate 12a and to transfer the holographic image 14a from the smooth surface 74 of the flat plate 72 to the substrate 12a, various methods may be employed. For example, heat and/or pressure may be applied to effect the seal between the substrate 12a and the holographic image 14a. As shown in FIG. 8, the holographic image 14a and the substrate 12a may be sandwiched between the flat plate 72 and a sealing plate 88 to effect a seal between the substrate 12a and the holographic image 14a. In addition, the sealing plate 88 may be heated to aid in effecting the seal between the holographic image 14a and the substrate 12a.

It will be understood that other methods of bondingly connecting and sealing the holographic image 14a and the substrate 12a in the batch process 68 for producing the holographic material 10a as described herein may be employed.

The holographic material 10a is then removed from the smooth surface 74 of the flat plate 72. Methods of removing the holographic material 10a from the flat plate 72 are known in the art. The holographic material 10a produced by the batch process 68 may be present in different forms such as a roll or sheets of holographic material 10a.

For the sake of brevity, only the use of the holographic material 10 for providing decorative covers for floral groupings such as cut flowers and potted plants will be described hereinafter. However, it will be understood that the holographic material 10a may be used in the same manner.

The term "floral grouping" as used herein means cut fresh flowers, artificial flowers, a single flower as well as fresh and/or artificial plants or other floral materials, and such term includes other secondary plants and/or ornamentation or artificial or natural materials which add to the aesthetics of the overall floral arrangement. The floral grouping may comprise a bloom (or foliage) portion and a stem portion. However, it will be appreciated that the floral grouping may consist of only a single bloom or only foliage. The term "floral grouping" may be used interchangeably herein with the terms "plant", "flower" and/or "floral arrangement". The term "floral grouping" may also be used interchangeably herein with the terms "botanical item" and/or "propagule".

Theterm "botanical item" when used herein means a natural herbaceous or woody plant, taken singly or in combination. The term "botanical item" also means any portion or portions of natural herbaceous or woody plants, taken singly or in combination The term "botanical item" also means any portion or portions of natural herbaceous or woody plants including stems, leaves, flowers, blossoms, buds, blooms, cones, or roots, taken singly or in combination, or in groupings of such portions such as a bouquet or floral grouping.

The term "propagule" when used herein means any structure capable of being propagated or acting as an agent of reproduction including seeds, shoots, stems, runners, tubers, plants, leaves, roots or spores.

The term "flower pot" refers to any type of container used for holding a floral grouping or a potted plant. Examples of flower pots are clay pots, plastic pots, wooden pots, pots made from natural and/or synthetic fiber, and the like.

Figure 9:
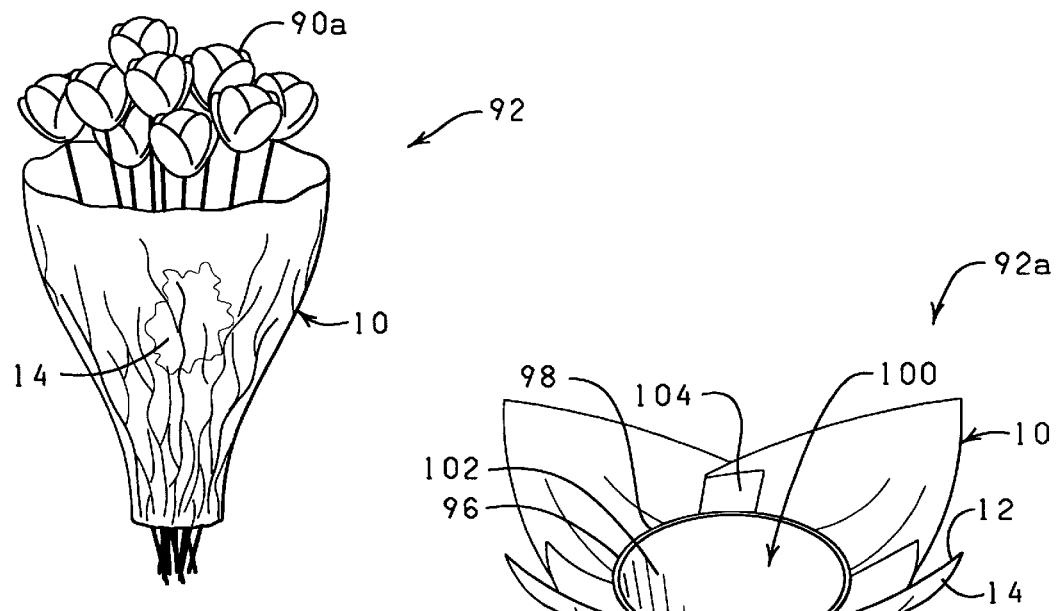
FIG. 9 is a perspective view illustrating a floral grouping wrapped with a sheet of holographic material constructed in accordance with the present invention.

Shown in FIG. 9 is the holographic material 10 wrapped about a floral grouping 90 wherein the floral grouping is cut flowers 90a to provide a decorative cover 92. In this way, the holographic image 14 of the holographic material 10 is readily visible and provides a desired optical effect to the decorative cover 92. Thus, the holographic image 14 constitutes at least a portion of the decor of the decorative cover 92.

Figure 10:
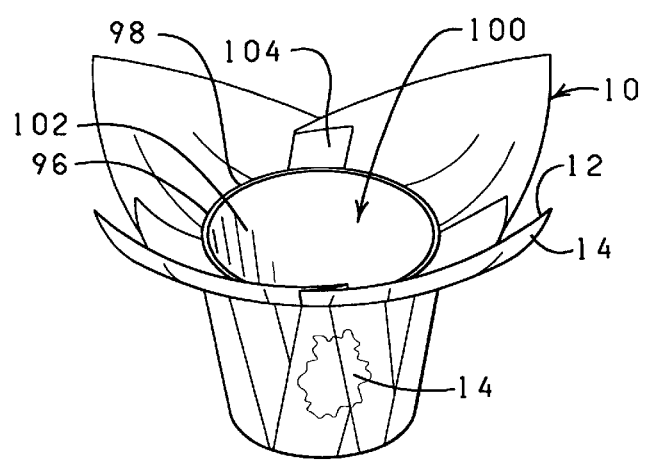
FIG. 10 is a perspective view illustrating a decorative pot cover formed from a holographic material constructed in accordance with the present invention.
Figure 11:
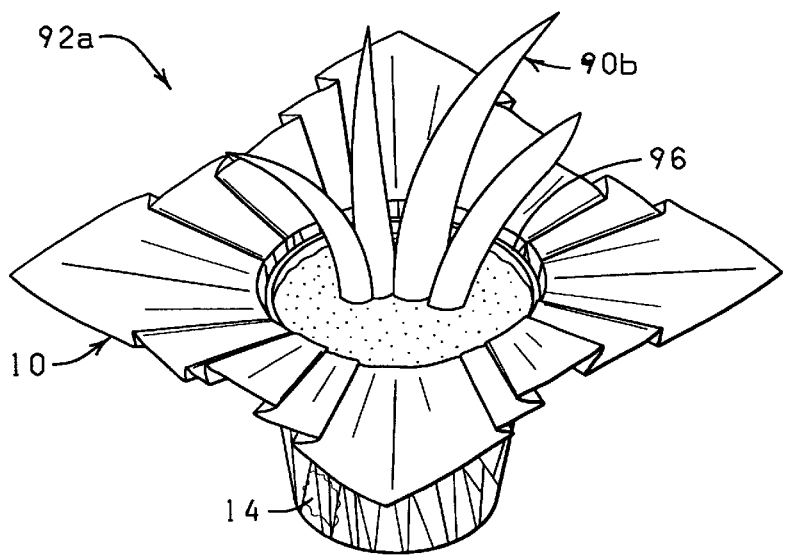
FIG. 11 is a perspective view illustrating the decorative pot cover of FIG. 10 wherein the pre-formed pot cover has a potted plant disposed therein.

The holographic material 10 may also be used to provide a decorative cover 92a for an object or item, such as the floral grouping 90 wherein the floral grouping is a flower pot or a potted plant 90b. The decorative cover 92a illustrated in FIG. 10 is constructed from the holographic material 10, and the decorative covering 92a illustrated in FIG. 11 has the potted plant 90b disposed therein.

A flower pot 96 having an outer peripheral surface 98 and a floral grouping retaining space 100 is provided, and the holographic material 10 is formed about the outer peripheral surface 98 of the flower pot 96 to provide the decorative cover 92a. The potted plant 90b is then disposed in the floral grouping retaining space 100 of the flower pot 94 provided in the decorative cover 92a.

In another method of providing the decorative cover 92a for the flower pot 96, the holographic material 10 is provided and formed into the decorative cover 92a prior to disposing the flower pot 96 into the decorative cover 92a. The decorative cover 92a formed in this manner has a plurality of overlapping folds which extend at various angles and at various instances. The decorative cover 92a is also provided with an object opening 102 which is formed through an upper end 104 of the decorative cover 92a. The object opening 102 is sized to receive the flower pot 96.

The system for forming the decorative cover 92a by this method is described in detail in U.S. Pat. No. 4,772,182, entitled, "Article Forming System", issued Sep. 27, 1988, which is hereby expressly incorporated herein by reference.

Once the decorative covering 92 is constructed, the flower pot 96 is disposed in the object opening 102 of the decorative covering 92 so that the decorative covering 92 encompasses a substantial portion of the outer peripheral surface 98 of the flower pot 96 to provide the decorative covering 92.

Now it will be understood that other applications of the holographic materials 10 and 10a will become apparent to one of ordinary skill in the art and include, but not by way of limitation, decorative wrappings for various food and gift items. Thus, uses of the holographic materials 10 and 10a are not limited to those described herein.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A continuous process for applying a holographic image to a substrate to produce a holographic material, the process comprising:

providing a printing element having a polished, resilient surface;

applying a metalized coating capable of receiving a holographic image to the polished, resilient surface of the printing element to provide a metalized coated surface;

embossing the metalized coated surface to provide a holographic image thereon, the holographic image having a first surface and a second surface wherein the second surface of the holographic image is disposed substantially adjacent the polished, resilient surface of the printing element, the holographic image further having a characteristic of being capable of producing a three-dimensional rendition of an object;

applying a bonding material to the first surface of the holographic image; and disposing a substrate having a smooth surface adjacent the first surface of the holographic image containing the bonding material so as to bondingly connect the holographic image to the substrate, thereby producing a holographic material and thus removing the holographic material from the polished, resilient surface of the printing element.

2. The continuous process of claim 1 wherein, in the step of providing a printing element, the printing element is selected from the group consisting of a cylindrical drum and a roller.

3. The continuous process of claim 1 wherein, in the step of providing a printing element, the printing element is constructed of a material selected from the group consisting of chrome, stainless steel and tool steel.

4. The continuous process of claim 1 wherein, in the step of applying a metalized coating, the metalized coating applied to the polished, resilient surface of the printing element is selected from the group consisting of metallic polymeric film, metallic non-polymeric film, foil, metalized lacquer and combinations thereof.

5. The continuous process of claim 1 wherein, in the step of disposing a substrate, the substrate is constructed of a material selected from the group consisting of polymeric film, non-polymeric film, foil, paper, tissue and combinations thereof.

6. A method for providing a decorative cover for a flower pot comprising:

providing a holographic material produced by applying a holographic image to a substrate, the holographic image further having a characteristic of producing a three-dimensional rendition of an object, the holographic material produced by a process comprising the steps of:

providing a printing element having a polished, resilient surface, the printing element being selected from the group consisting of a cylindrical drum and a roller;

applying a metalized coating capable of receiving a holographic image to the polished, resilient surface of the printing element to provide a metalized coated surface;

embossing the metalized coated surface to provide a holographic image thereon, the holographic image having a first surface and a second surface wherein the second surface of the holographic image is disposed substantially adjacent the polished, resilient surface of the printing element;

applying a bonding material to the first surface of the holographic image; and disposing a substrate having a smooth surface adjacent the first surface of the holographic image containing the bonding material so as to bondingly connect the holographic image to the substrate, thereby producing a holographic material and thus removing the holographic material from the polished, resilient surface of the printing element;

forming the holographic material into a decorative cover having a plurality of overlapping folds therein wherein the overlapping folds extend at various angles and at various instances, the decorative cover having an object opening formed through an upper end thereof sized to receive a flower pot;

providing a flower pot having an outer peripheral surface; and disposing the flower pot in the object opening of the decorative cover with the decorative cover encompassing a substantial portion of the outer peripheral surface of the flower pot.

7. The method of claim 6 wherein, in the step of providing the printing element, the printing element is constructed of a material selected from the group consisting of chrome, stainless steel and tool steel.

8. The method of claim 6 wherein, in the step of applying a metalized coating, the metalized coating applied to the polished, resilient surface of the printing element is selected from the group consisting of metallic polymeric film, metallic non-polymeric film, foil, metalized lacquer and combinations thereof.

9. The method of claim 6 wherein, in the step of disposing a substrate, the substrate is constructed of a material selected from the group consisting of polymeric film, non-polymeric film, foil, paper, tissue and combinations thereof.

10. A method for providing a decorative cover for a flower pot comprising:

providing a holographic material produced by applying a holographic image to a substrate, the holographic image further having a characteristic of producing a three-dimensional rendition of an object, the holographic material produced by a process comprising the steps of:

providing a printing element having a polished, resilient surface, the printing element being selected from the group consisting of a flat plate and a platen press;

applying a metalized coating capable of receiving a holographic image to the polished, resilient surface of the printing element to provide a metalized coated surface;

embossing the metalized coated surface to provide a holographic image thereon, the holographic image having a first surface and a second surface wherein the second surface of the holographic image is disposed substantially adjacent the polished, resilient surface of the printing element;

applying a bonding material to the first surface of the holographic image; and disposing a substrate adjacent the first surface of the holographic image containing the bonding material so as to bondingly connect the holographic image to the substrate, thereby producing a holographic material and thus removing the holographic material from the polished, resilient surface of the printing element;

forming the holographic material into a decorative cover having a plurality of overlapping folds therein wherein the overlapping folds extend at various angles and at various instances, the decorative cover having an object opening formed through an upper end thereof sized to receive a flower pot;

providing a flower pot having an outer peripheral surface; and disposing the flower pot in the object opening of the decorative cover with the decorative cover encompassing a substantial portion of the outer peripheral surface of the flower pot.

11. The method of claim 10 wherein, in the step of providing the printing element, the printing element is constructed of a material selected from the group consisting of chrome, stainless steel and tool steel.

12. The method of claim 10 wherein, in the step of applying a metalized coating, the metalized coating applied to the polished, resilient surface of the printing element is selected from the group consisting of metallic polymeric film, metallic non-polymeric film, foil, metalized lacquer and combinations thereof.

13. The method of claim 10 wherein, in the step of disposing a substrate, the substrate is constructed of a material selected from the group consisting of polymeric film, non-polymeric film, foil, paper, tissue and combinations thereof.

* * * * *

UNITED STATES PATENT AND TRADEMARK OFFICE
CERTIFICATE OF CORRECTION

PATENT NO. : 6,461,463 B1
DATED : October 8, 2002
INVENTOR(S) : Donald E. Weder

It is certified that error appears in the above-identified patent and that said Letters Patent is hereby corrected as shown below:

Column 3,
Line 66, delete the word "hereinafte" and replace with word -- hereinafter --.

Column 7,
Line 8, delete the number "50" and replace with number -- 48 --; and delete the number "10" and replace with number -- 14 --.
Line 65, there needs to be a space between the words "The" and "term".

Column 8,
Line 38, delete number "94" and replace with number -- 96 --.

Signed and Sealed this

Twenty-fifth Day of May, 2004

JON W. DUDAS
*Acting Director of the United States Patent and Trademark Office*